United States Patent
Dian

[15] 3,694,051
[45] Sept. 26, 1972

[54] BICYCLE REFLECTOR AND HANGER THEREFOR

[72] Inventor: Walter Dian, Downers Grove, Ill.

[73] Assignee: Excel, Incorporated, Franklin Park, Ill.

[22] Filed: Dec. 30, 1970

[21] Appl. No.: 102,646

[52] U.S. Cl. .....................350/97, 248/322, 280/289
[51] Int. Cl. ..............................................G02b 5/12
[58] Field of Search ..350/97; 248/317, 322; 280/289

[56] References Cited

UNITED STATES PATENTS

| 3,586,348 | 6/1971 | Rich | 280/289 |
| 2,671,423 | 3/1954 | Mead | 350/97 |
| 1,089,003 | 3/1914 | Mayerle | 350/97 |

*Primary Examiner*—David Schonberg
*Assistant Examiner*—Robert L. Sherman
*Attorney*—Hill, Sherman, Meroni, Gross & Simpson

[57] ABSTRACT

Bicycle reflector and hanger, hanging the reflector from the seat of a bicycle to maintain the reflective face of the reflector in a generally vertical position regardless of the angle of bicycle and seat relative to the vertical.

3 Claims, 3 Drawing Figures

PATENTED SEP 26 1972
3,694,051
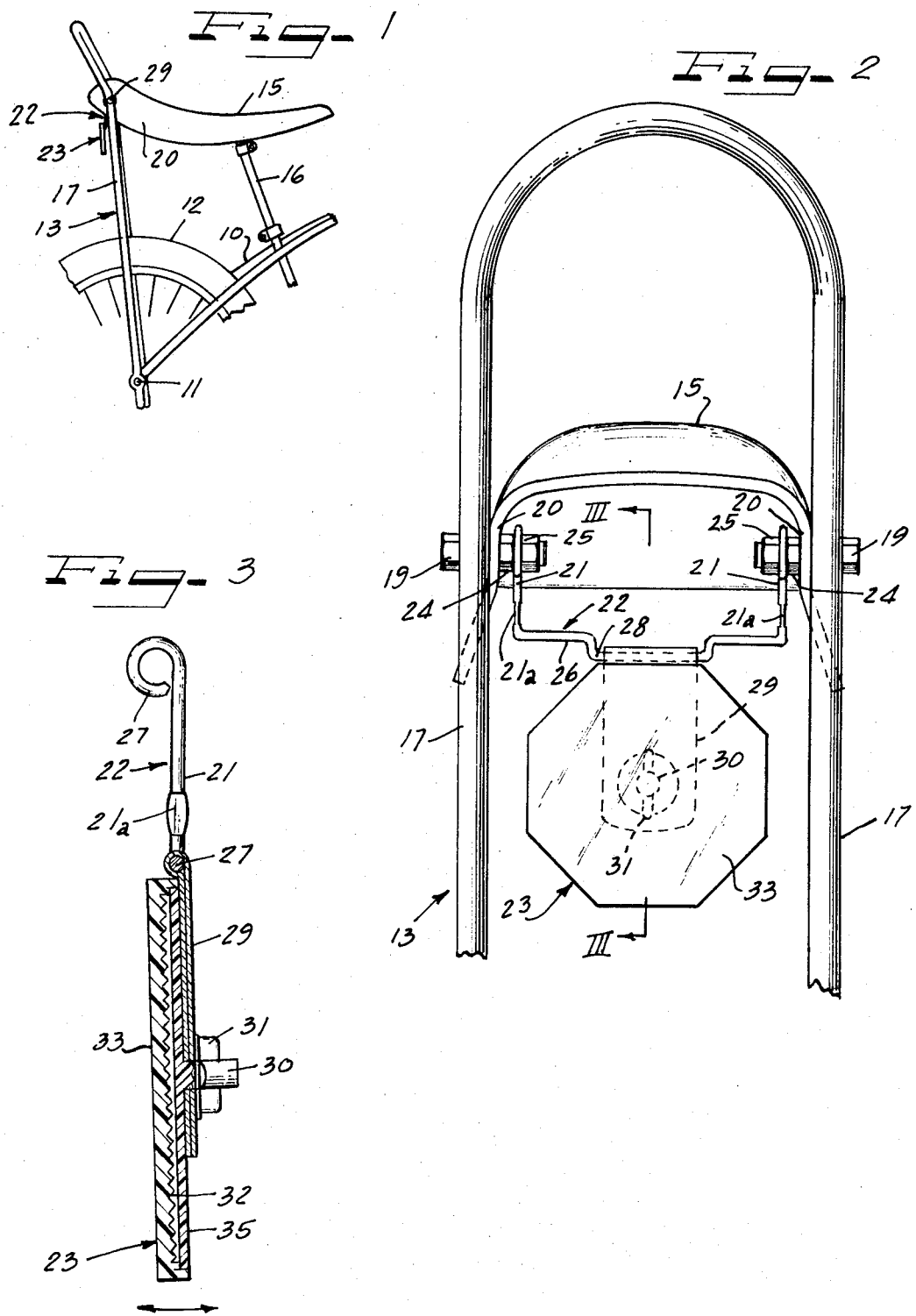
INVENTOR.
WALTER DIAN

BICYCLE REFLECTOR AND HANGER THEREFOR

FIELD OF THE INVENTION

Bicycle reflector and hanger therefor.

BACKGROUND, SUMMARY AND OBJECTS OF THE INVENTION

It is a requirement of many states that the rear reflector of a bicycle be mounted within five degrees of vertical, in order to obtain the best advantage of the reflective surfaces of the reflector. It has heretofore been the practice to mount the reflector on a rigid support, with the reflector vertical when the bicycle and seat are on level ground. Even where the reflector was correctly mounted, its support was rigid and usually made from a wire or sheet metal yoke, welded to the base of the seat and was never rigid enough to insure the proper position of the reflector when it was inadvertently bumped or pushed out of position. The reflector was then useless as a warning device. Also with a rigid support, where the bicycle is going up and down grades, the reflector may be at such an angle relative to the vertical as to be virtually hidden. Where the seat is spring supported, the weight of a person on the seat may also change the position of the reflector to an undesirable extent.

In accordance with the principles of the present invention, a simple form of hanger is provided assuring that the reflective face of the reflector be substantially vertical, regardless of the operative position of the bicycle and the slope along which the bicycle travels.

An object and advantage of the invention is to suspend a bicycle reflector from the seat of a bicycle for movement about a horizontal pivot, so located with respect to the center of gravity of the reflector, as to assure that the reflector maintain a generally vertical position.

Another object of the invention is to provide a simple and improved form of hanger for a bicycle refector, arranged with a view toward suspending the reflector to conform to the vertical, regardless of the position of the bicycle while traveling or stopping with the rider holding the bicycle upright.

Another object of the invention is to provide additional safety by increasing the "signal value" of the reflector, by accommodating occasional slight movement of the reflector when the bicycle is in motion to maintain the reflector in a substantially vertical position at all times during operation of the bicycle.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic side view showing a bicycle seat and its support illustrating the principle of suspending the reflector from the seat;

FIG. 2 is an enlarged view of the bicycle seat, hanger and reflector, looking toward the rear end of the seat; and FIG. 3 is a sectional view looking substantially along line III—III of FIG. 2.

DESCRIPTION OF PREFERRED EMBODIMENT OF INVENTION

In the embodiment of the invention illustrated in FIG. 1 of the drawings, I have diagrammatically shown a fragment of the rear portion of a bicycle frame 10, supported at the rear end of said frame on a transverse axle 11 for a wheel 12. The wheel 12 may be driven from a conventional chain and sprocket drive, which is no part of the present invention so need not be shown or described herein. Mounted on the axle 11 on opposite sides of the wheel 12 and extending upwardly therefrom is a support frame 13 for a seat 15. The seat 15 is shown as being what is known to the trade as a banana-type seat, but may be of various other conventional forms. Said seat is supported at its forward end on a post 16 extending upwardly from and suitably secured to the frame 10. The seat 15, support 13 and post 16 are of well-known constructions so a detailed description thereof need not be given herein.

The support 13 is shown as being generally U-shaped in form, having parallel legs 17 mounted on the axle 11 and extending outwardly along opposite sides of the seat 15 and above the seat and connected together to form an inverted U with the portion of the support extending above the seat inclined rearwardly.

As shown in FIGS. 1 and 2, axially aligned bolts 19 extend transversely through the legs 16 and through side portions 20 of the seat 15, which may be reinforced with metal, and form supports for the seat 15 adjacent the rear end portion of the seat.

The bolts 19 extend inwardly of the side portions 20 of the seat and also form mountings for upright legs 21 of a generally U-shaped suspension hanger 22 for a reflector 23, hanging said reflector for free pivotal movement about a horizontal transverse axis parallel to axes of the bolts or pins 19. Nuts 24 threaded on the bolts 19 may be provided to hold the seat to the support 13, while nuts 25 threaded on said bolts may be provided to retain the hanger to said bolts, to depend therefrom in relatively rigid relation with respect thereto. The nuts 24 and 25 may be locked in any suitable manner.

The hanger 22 is herein shown as being formed from a single piece of wire by bending. The legs 21 may be bent to extend upwardly from opposite sides of a transversely extending base 26 of the hanger and to have forwardly and downwardly curled upper end portions, forming eyes 27 to be mounted on the bolts 19 and to position the legs 21 to depend from said bolts. The base 26 is shown as bent downwardly along the center thereof, forming a recessed hinge portion 28, forming a transverse pivotal mounting for a hanger plate 29, and retaining said hanger plate for free pivotal movement about the axis of said hinge portion and limited sidewise movement along said hinge portion.

The hanger plate 29 extends along the back side of the reflector 23 and upwardly therefrom and so hangs the reflector with respect to the center of gravity of said reflector to suspend the reflector in a substantially vertical position when freely hung by said hanger. The hanger plate 29 and means for mounting said hanger plate on the back side of the reflector 23 will hereinafter be more clearly described as this specification proceeds.

The legs 21 of the hanger 22 are flattened adjacent the base 26, along parallel vertical planes extending in the direction of travel of the bicycle, as indicated by reference numeral 21ª. The purpose of flattening the legs 21 at the base 26, is to accommodate bending of the legs about the flattened portion thereof without bending the base, in cases where the bolts 19 may become misaligned, to prevent bending of the base 26 and hinge portion 28 and thereby avoid binding of the reflector on the hinge portion, and hindering free pivotal movement thereof.

The hanger plate 29 is a flat two-layer plate formed from a single strip of steel or other suitable material bent along its transverse center for convenience in assembling said plate to the hinge portion 28. The plate may be bent intermediate its ends to step one portion above the other and form an arcuate or concave shoulder therein. The arc of the concave shoulder is of a slightly larger diameter than the diameter of the recessed hinge portion 28 of the base of the hanger 22, and forms an eye extending forwardly of a back plate 35 of the reflector and above the top thereof, to fit about the recessed portion of the base 26, when the two end portions of the flat strip of steel are bent into abutting engagement with each other. The hanger plate is drilled adjacent its lower end portion to fit along a lug 30, extending from the back of the reflector and perpendicular thereto. The back plate 35 may be recessed within the reflector and adhesively or otherwise secured thereto.

The lug 30 and back plate 35 of the reflector may be integrally formed from a suitable plastic material in any well-known manner. Thus, when the hanger plate is bent around the recessed portion of the base of the hanger 22, the hanger plate may be placed with the drilled portions thereof registering and extending along the lug 30 and moved along said lug into firm engagement with the back of the reflector. A grip nut 31 or other self-locking fastening device may then be placed on the lug 30, to tightly hold the hanger plate to the back of the reflector. The self-locking fastening device may be of a conventional form commonly used to secure metal to plastic materials and is no part of the present invention, so need not herein be shown or described further.

The reflector 23 may be a well-known form of reflector having substantial thickness, shown as having an octagonal reflecting surface and made from a suitable plastic material having a reflecting surface 32 disposed behind and beneath an outer face 33 of the reflector.

It may be seen from FIG. 3 that the hanger 22 hung from the bolts 19 supporting the reflector between legs 17 of the support 13 for the seat hangs the reflector for movement about the horizontal transverse axis of the recessed hinge portion 28 of the base 26, with the axis of pivotal movement of the reflector disposed above and offset from the back face thereof in the direction of travel of the bicycle, to assure that the reflector hang in a substantially vertical position.

It may be seen from the foregoing that since the hanger plate 29 is freely pivoted on the recessed hinge portion 28 of the base 26 about a horizontal axis extending transversely between the legs 17 of the support 13, and since the weight of the reflector is offset to the extent sufficient to balance the suspended reflector relative to the pivotal axis of the hinge portion 28 of the hanger, that the reflector will hang in a generally vertical position regardless of the position of the bicycle and seat 15 relative to the horizontal.

The reflector is thus suspended in a most efficient position for reflecting rays of light projected thereon by automotive vehicle headlights and other light sources, and the suspension means is simple in construction and may readily be adapted to various types of bicycles and seats without alteration of the support. The flattened portions 21a of the legs 21 further accommodate limited bending about said flattened portions without bending the base 26 or recessed hinge portion 27 and thereby maintain the base 26 and hinge portion 27 free and assure the freedom from binding of the hanger plate on said hinge portion. Moreover, since the reflector is suspended to freely swing about the axis of the hinge portion 28, when the bicycle comes to a stop the reflector will swing back and forth with a resultant increase in the signal value of the reflector.

I claim as my invention:

1. In a bicycle reflector and in combination with a bicycle having at least a rear wheel and axle, a bicycle seat support frame mounted on said axle and extending upwardly therefrom along opposite sides of the wheel and a bicycle seat mounted on said frame in alignment with and above said rear wheel on said support frame at its rear end, a reflector of substantial thickness having a front reflector face extending over the area of the reflector and adapted to face rearwardly relative to the direction of travel of the bicycle, and having a plain back face, means hanging said reflector from said bicycle seat for free pivotal movement about a transverse axis spaced above and forwardly of said back face, when referring to the direction of travel of the bicycle, to tilt into a generally vertical position regardless of the position of the bicycle and seat with respect to the ground and for limited sidewise movement comprising, a hanger generally U-shaped in form having parallel upright legs generally round in cross section rigidly secured to said seat and depending therefrom and having a horizontally extending base forming a bearing support, wherein the base of said hanger is bent to provide a central recessed hinge portion forming a pivot for said hanger plate and limiting lateral movement of said hanger plate along said base, said legs being flattened in parallel planes adjacent said base extending parallel to the direction of travel of the bicycle, to accommodate limited bending of said legs without deforming said base, a hanger plate extending along the back side of the reflector and upwardly therefrom and having one layer abutting the plain back face of the reflector, a central transversely extending concave shoulder, a second layer bent about said concave shoulder about said horizontally extending base of said hanger into abutting engagement with said first layer, means securing said reflector to said hanger plate and said hanger plate to said horizontally extending base to freely depend therefrom and suspend said reflector for free pivotal movement about the axis of said base of said hanger in such spaced relation with respect to the axis of the base of said hanger as to balance the reflector to hang in a generally vertical position.

2. The bicycle reflector of claim 1, wherein the means securing the hanger plate to the back of the reflector comprises, a lug extending rearwardly of the reflector through said hanger plate, and a grip nut on said lug tightly holding the layers of said hanger plate in engagement with each other and holding said hanger plate in firm abutting engagement with the back face of the reflector.

3. The bicycle reflector of claim 2, wherein the U-shaped hanger is bent from wire, wherein the legs of the hanger are curled downwardly at their upper ends in the direction of travel of the vehicle, to provide eyes to extend about the means securing the legs to the bicycle seat and to be firmly secured thereto.

* * * * *